(12) United States Patent
Jonsson et al.

(10) Patent No.: US 8,437,342 B2
(45) Date of Patent: May 7, 2013

(54) PROVIDING LOCATION INFORMATION IN AN IP MULTIMEDIA SUBSYSTEM NETWORK

(75) Inventors: Annika Gerd Helena Jonsson, Enskede (SE); Tobias Austrell, Älvsjö (SE); Maria-Carmen Belinchõn Vergara, Getafe (ES); Berta Isabel Escribano Bullon, Madrid (ES); Nuria Esteban Vares, Aranjuez (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 151 days.

(21) Appl. No.: 12/999,839

(22) PCT Filed: Jun. 30, 2008

(86) PCT No.: PCT/EP2008/058361
§ 371 (c)(1),
(2), (4) Date: Dec. 17, 2010

(87) PCT Pub. No.: WO2010/000295
PCT Pub. Date: Jan. 7, 2010

(65) Prior Publication Data
US 2011/0090903 A1    Apr. 21, 2011

(51) Int. Cl.
*H04L 12/66* (2006.01)
*H04W 4/00* (2009.01)

(52) U.S. Cl.
USPC .......................... 370/356; 455/435.1

(58) Field of Classification Search ........................ None
See application file for complete search history.

(56) References Cited

U.S. PATENT DOCUMENTS

| | | | |
|---|---|---|---|
| 2004/0148416 A1* | 7/2004 | Aarnos et al. | 709/230 |
| 2005/0009520 A1* | 1/2005 | Herrero et al. | 455/435.1 |
| 2006/0155871 A1* | 7/2006 | Ilkka et al. | 709/238 |
| 2006/0178132 A1* | 8/2006 | Tammi et al. | 455/411 |
| 2006/0286980 A1* | 12/2006 | Hua | 455/435.1 |

FOREIGN PATENT DOCUMENTS

DE    10 2006 026929 A1    12/2007

OTHER PUBLICATIONS

"IMS Registration per Access Network" IP.Com Journal, IP.Com Inc., West Henrietta, NY, Dec. 6, 2007, XP013123095.

* cited by examiner

*Primary Examiner* — Melanie Jagannathan

(57) ABSTRACT

A method and apparatus for providing location information to a CSCF in an IMS network. An S-CSCF registers a first contact associated with an IMPU, and receives location information associated with the first contact. A second contact associated with the same IMPU, and also with a mobile access, is then registered at the S-CSCF. The S-CSCF receives location information associated with the second contact.

5 Claims, 6 Drawing Sheets

PROVIDING LOCATION INFORMATION IN AN IP MULTIMEDIA SUBSYSTEM NETWORK

TECHNICAL FIELD

The invention relates to the field of providing location information to a Serving-Call Session Control Function in an IP Multimedia Subsystem Network.

BACKGROUND

The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session.

The IMS makes use of the Session Initiation Protocol (SIP) to set up and control calls or sessions between user terminals. The Session Description Protocol (SDP), carried by SIP signals, is used to describe and negotiate the media components of the session. Whilst SIP was created as a user-to-user protocol, the IMS allows operators and service providers to control user access to services and to charge users accordingly.

FIG. 1 illustrates schematically how the IMS fits into the mobile network architecture in the case of a General Packet Radio Service (GPRS) access network. As shown in FIG. 1 control of communications occurs at three layers (or planes). The lowest layer is the Connectivity Layer 1, also referred to as the bearer plane and through which signals are directed to/from user equipment, UE, accessing the network. The entities within the connectivity layer 1 that connect an IMS subscriber to IMS services form a network that is referred to as the IP-Connectivity Access Network, IP-CAN. The GPRS network includes various GPRS Support Nodes (GSNs). A gateway GPRS support node (GGSN) 2 acts as an interface between the GPRS backbone network and other networks (radio network and the IMS network). The middle layer is the Control Layer 4, and at the top is the Application Layer 6.

The IMS 3 includes a core network 3a, which operates over the middle, Control Layer 4 and the Connectivity Layer 1, and a Service Network 3b. The IMS core network 3a includes nodes that send/receive signals to/from the GPRS network via the GGSN 2a at the Connectivity Layer 1 and network nodes that include Call/Session Control Functions (CSCFs) 5, which operate as SIP proxies within the IMS in the middle, Control Layer 4. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF. The top, Application Layer 6 includes the IMS service network 3b. Application Servers (AS) 7 are provided for implementing IMS service functionality IMS is intended to deliver services such as multimedia telephony, IPTV, messaging, presence, push-to-talk etc. IMS is used to handle user authentication and authorization and other security functions, addressing and session establishment, end user charging and inter-operator accounting, service logic, correct quality of service, and inter operator interworking. An IMS operator is typically a mobile, fixed or Internet access operator.

IMS is access independent, and therefore the core IMS network has no knowledge of a user's access type and not need to know this information, since the way of working should be the same regardless of the access type.

Every IMS user is provided with one or more Private User Identities (IMPI). An IMPI is assigned by the home network operator, and used for by the network for registering the user having the IMPI with the network. A user having an IMPI may have one or Public User Identities (IMPU). An IMPU can be used by the user for requesting communications to other users (in the form of SIP URI or a tel URL). An example relationship between the IMS subscription, IMPIs and IMPUs is illustrated in FIG. 2, in which an IMS subscriber has two IMPIs and 6 IMPUs. Each IMPU is in turn associated with a service profile, which can set rules for how communications are handled depending on which IMPU has been used for a session.

As shown in FIG. 2, IMPUs may be shared between multiple IMPIs within the same IMS subscription. For example, in FIG. 2, Public User Identity 3 can be used by both Private User Identity 1 and Private User Identity 2. It is therefore possible for a particular IPMU to be simultaneously registered from multiple UEs that use different IMPIs and different contact addresses. If an IMPU is shared among the IMPIs of a subscription, then it is assumed that all IMPIs share the IMPU.

Referring now to FIG. 3, a general registration process is described, with the following numbering corresponding to the numbering used in FIG. 3:

S1. A user's UE 8 sends a Register information flow to a Proxy-Call session Control Function (P-CSCF) 9. The information includes the user's IMPI, IMPU, home network domain name, and/or UE IP address.

S2. The P-CSCF 9 examines the "home domain name" to discover the entry point to the user's home network (i.e. the I CSCF 10). The P-CSCF 9 sends the Register information flow to the I-CSCF 10, the information now including the P-CSCF address/name, IMPU, IMPI, P-CSCF network identifier, and UE IP address.

S3. The I-CSCF 10 sends a Cx-Query/Cx-Select-Pull information flow to the Home Subscriber Server 11 in the user's home network (containing the IMPI, IMPU and P-CSCF network identifier). The HSS 11 checks to ensure that the user is registered already. The HSS 11 indicates whether the user is allowed to register in that P-CSCF 9 network (identified by the P-CSCF network identifier) according to the User subscription and operator limitations/restrictions if any. At his point, a Roaming Restriction may be checked to ascertain whether the user is connected using fixed or mobile access. A P-Access-Network-Info (PANI) header is used to differentiate the access type and therefore the roaming checks to apply. If the user is using mobile access, the HSS 11 may send a MAP-ANY-TIME-obtain an SGSN number. When receiving the response, the HSS 11 analyses the received SGSN number, which indicates if the user is located in a home or in a visited area. If the user is roaming in a visited area and the SGSN number matches a configured GPRS roaming area, the user is allowed to roam. The HSS stores location information indicating an area in which the user is roaming. Alternatively, the HSS may send a Get Master Session Information message by means of a Cx-like User-Data-Request (UDR) message to a Session Manager (AAA). When receiving a response, the HSS 11 analyses the received SGSN MCC-MNC number that indicates if the user is located in the home or in a visited area. If the user is roaming and the SGSN MCC-MNC number matches a configured GPRS roaming area, the user is allowed to roam. The HSS 11 stores this location information. In either case, the HSS stores the location information.

S4. A Cx-Query Resp/Cx-Select-Pull Resp is sent from the HSS 11 to the I-CSCF 10, containing an identity of the S-CSCF 12, if it is known by the HSS 12, and the capabilities of the S-CSCF 12, if it is necessary to select a new S-CSCF.

S5. The I-CSCF 10 sends the register information flow (P-CSCF address/name, Public User Identity, Private User Identity, P CSCF network identifier, UE IP address, I-CSCF (THIG) in case network configuration hiding is desired) to the selected S-CSCF 12.

S6. The S-CSCF 12 sends a Cx-Put/Cx-Pull (Public User Identity, Private User Identity, S CSCF name) to the HSS 11.

S7. The HSS 11 stores the S-CSCF 12 identity for that user and returns the information flow Cx-Put Resp/Cx-Pull Resp (user profile) to the S-CSCF 12. The location information obtained in step S3 may also be returned to the S-CSCF 12. Note this profile request is performed only if the S-CSCF 12 has no information previously stored for the user's IMPU.

S8. Based on the user profile, the S-CSCF 12 performs any appropriate service control procedures.

S9. The S-CSCF 12 sends a 200 OK message (containing the home network contact information) to the I-CSCF 10.

S10. The I-CSCF 10 sends a 200 OK message (containing the home network contact information) to the P-CSCF 9. The I-CSCF 10 releases all registration information after sending the 200 OK.

S11. The P-CSCF 9 stores the received home network contact information, and sends a 200 OK message to the UE 8.

3GPP Rel-7 allows a user to register one or more contacts per IMPI/IMPU pair. Contacts identify a terminal and the software running on the terminal. It is possible to register several contacts for a user via fixed and mobile access simultaneously. Note that Contacts can also be used to identify the same terminal using two different accesses to access the network. Contacts are known in the S-CSCF 12, but not in the HSS 11. FIG. 4 illustrates example configurations of contacts, IMPUs, IMPIs and subscriptions. In FIG. 4*a*, the same IMPI and IMPU are registered simultaneously via fixed and mobile access using different contacts. In FIG. 4*b*, the IMPI is registered simultaneously via fixed and mobile access by using different IMPUs.

SUMMARY

Location information for registered Contact 2 shown in FIG. 4*a* is not available to the S-CSCF 12. When registering the first contact (Contact 1) via, for example, fixed access, the S-CSCF 12 requests the profile information from the HSS 11 via Cx-Put/Pull commands, and since this is fixed access, no location is returned. When registering the Contact 2, the S-CSCF 12 already has the profile for the IMPI/IMPU pair, so there is no trigger to download location information for Contact 2, even though it applies to mobile access where location information could be required. For many applications, this is not a problem, as the S-CSCF 12 does not require the second contact registration. However, the inventors have realised that a problem arises if the S-CSCF is not provided with the mobile location information (that would otherwise be sent in step S7) since it can be used to validate that each SIP request originating from the registered contact includes a PANI with the obtained roaming information. If this information is missing or incorrect, S-CSCF adds or modifies the PANI to include the correct information. The S-CSCF 12 needs to be aware of the correct location information in order to make the correct addition or modification. A particular requirement is in charging, where the PANI is sent to a charging function and charging is based on roaming information. The PANI can also be sent to Application Servers, and used by the Application Servers to provide a location-based decision or service.

According to a first aspect of the invention, there is provided a method of providing location information to a CSCF in an IMS network. An S-CSCF registers a first contact associated with an IMPU, and receives location information associated with the first contact. A second contact associated with the same IMPU, and also with a mobile access, is then registered at the S-CSCF. The S-CSCF receives location information associated with the second contact. This allows the S-CSCF to make correct additions or modifications to PANI.

As an option, the location information associated with the second contact is received from an I-CSCF. The location information associated with the second contact was previously sent to the I-CSCF from a HSS after the second contact was registered at the HSS. As a further option, the location information associated with the second contact is received from the I-CSCF in a SIP message.

In an alternative option, the method further comprises receiving an indictor from an I-CSCF, indicating that location information associated with the second contact is available at a HSS. The location information associated with the second contact is received in response to a request sent from the S-CSCF to the HSS requesting the location information. Optionally, the indicator is sent in a SIP message.

As an alternative option, the S-CSCF determines that the second contact is associated with the same IMPU as the first contact, and that an access type for the second contact is different to that of the first contact. As a result of this determination, the S-CSCF sends a request to a HSS for location information associated with the second contact, and subsequently receives the location information associated with the second contact in response to the request. Optionally, the request for location information comprises a request for a user profile associated with the second contact, the user profile including the location information. As a further option, the determination that the access type for the second contact is different to that of the first contact comprises comparing access type information contained in a PANI header in a message relating to the first contact with access type information contained in a PANI header in a message relating to the second contact.

According to a second aspect of the invention, there is provided a S-CSCF that is provided with a first receiver for receiving a request to register a first contact associated with an IMPU, and for receiving location information associated with the first contact. A memory stores the location information associated with the first contact. A second receiver is arranged to receive a request to register a second contact associated with the IMPU, and a third receiver is arranged to receive location information associated with the second contact.

As an option, the third receiver is arranged to receive location information associated with the second contact from either an I-CSCF or a HSS. The S-CSCF is optionally provided with a processor for determining that the second contact is associated with the same IMPU as the first contact, and that an access type for the second contact is different to that of the first contact. As a result of the determination, the processor is arranged to ensure that a request is sent a HSS for location information associated with the second contact.

According to a third aspect of the invention, there is provided an I-CSCF. The I-CSCF is provided with a receiver for receiving from a HSS information relating to location information associated with a second contact, where a first contact associated with the same IMPU as the second contact is already registered. A transmitter is also provided for sending the information relating to the location information to a S-CSCF.

Optionally, the information relating to location information associated with the second contact is selected from one of location information associated with the second contact and an indication that location information associated with the second contact is stored at the HSS.

DETAILED DESCRIPTION

The following description assumes that a first contact associated with an IMPI/IMPU pair is already registered at the S-CSCS 12, and the S-CSCF 12 has already obtained location information for the first contact. The problem addressed by the invention is providing location information to the S-CSCF for a second contact associated with the same IMPU as the first contact.

Figure 1:
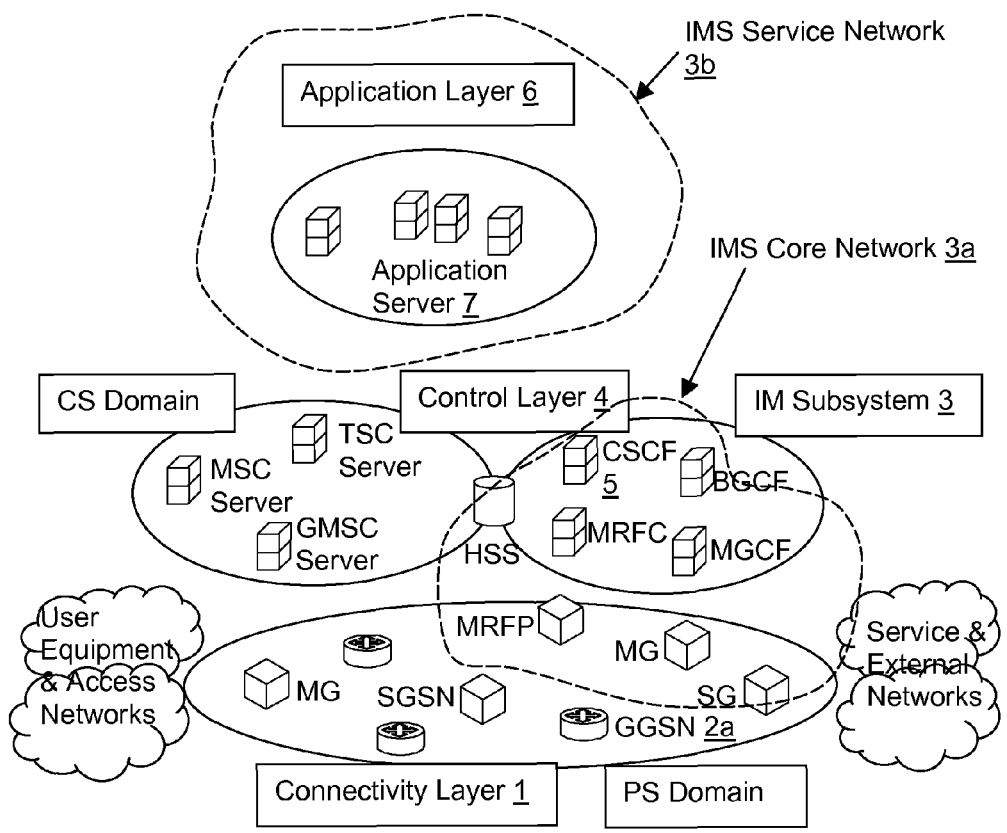
FIG. 1 illustrates schematically in a block diagram an IMS network in association with a mobile network architecture of a General Packet Radio Service (GPRS) access network.
Figure 2:
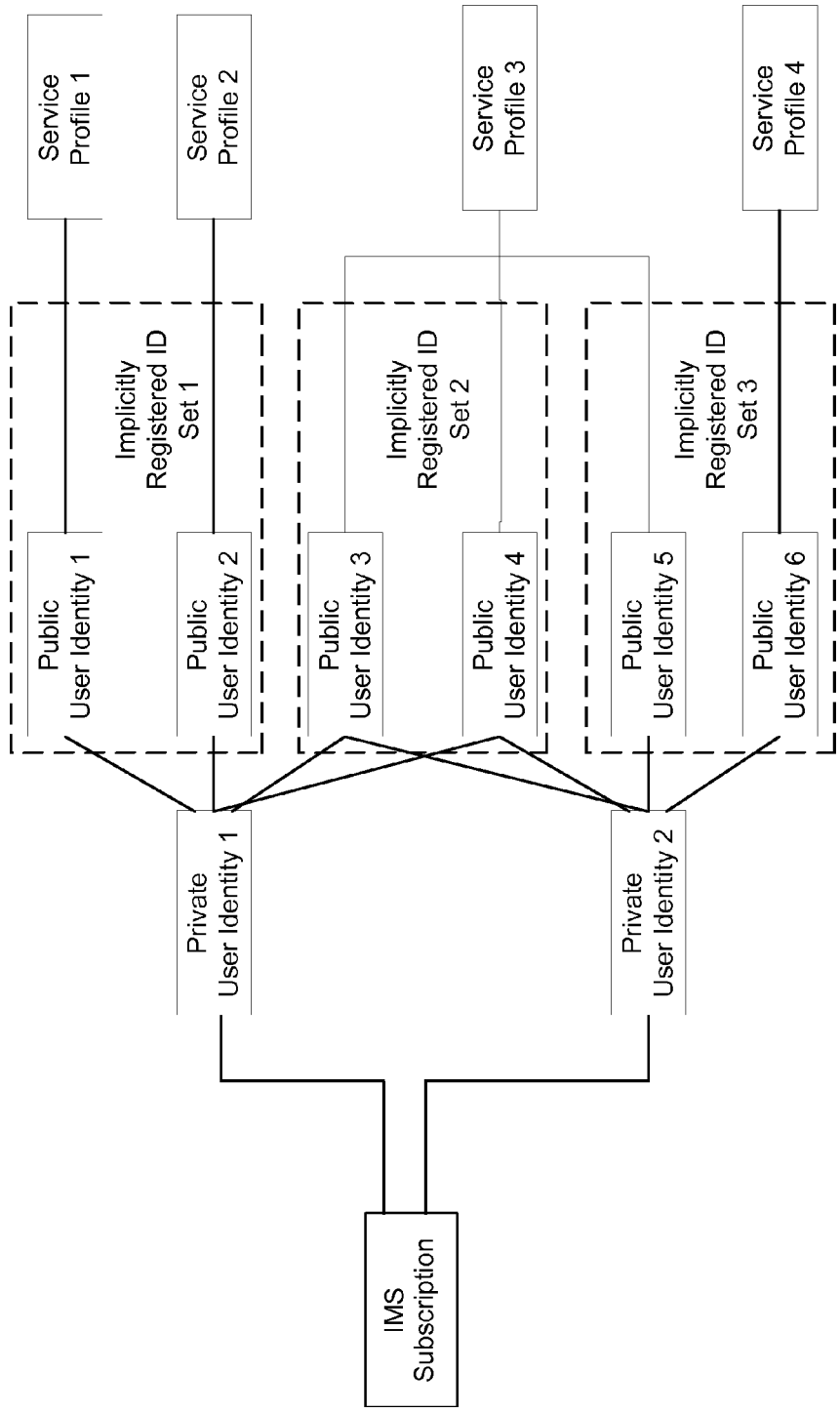
FIG. 2 illustrates schematically in a block diagram an example relationship between an IMS subscription, and a plurality of public and private user identities.
Figure 3:
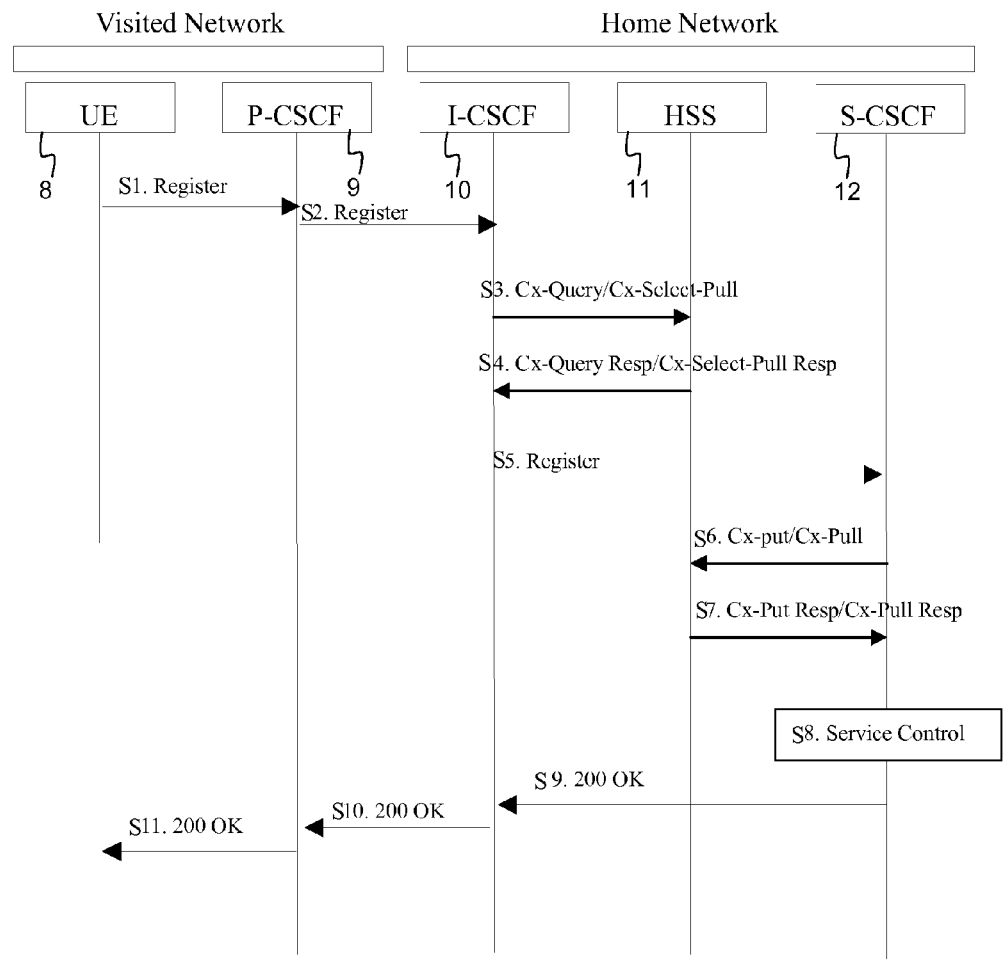
FIG. 3 is a signalling diagram illustrating schematically the signalling involved in registering a user.
Figure 4A:
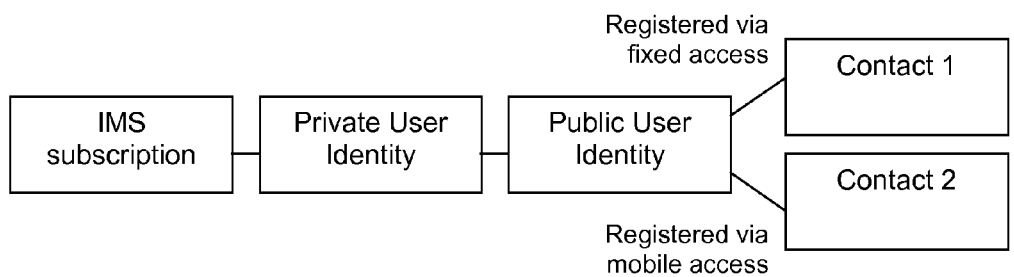
FIG. 4 illustrates schematically in a block diagram example relationships between IMS subscriptions, public and private user identities, and registered contacts.
Figure 4B:
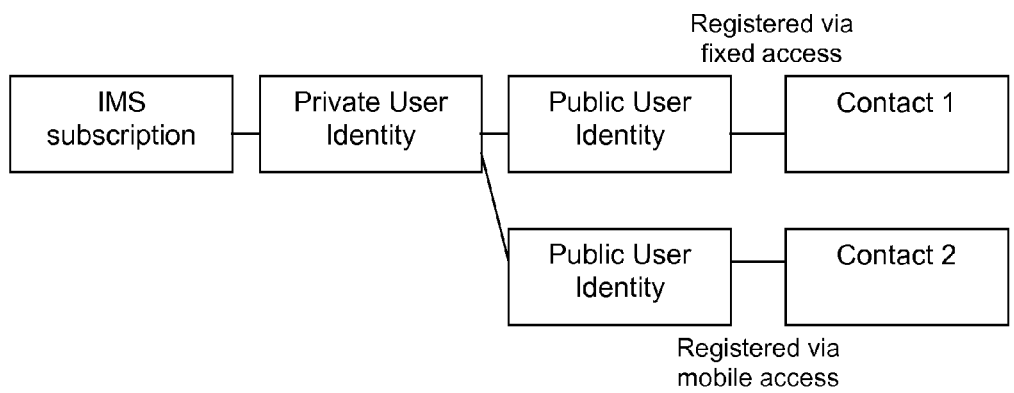

A simple solution to the problem of providing location information for a second contact would be for the S-CSCF 12 to always request location information from the HSS 11 when a new contact is registered. However, this would be wasteful of resources, as in most cases no new information will be received. It is therefore desirable to provide location information to the S-CSCF 12 only when it is needed In a first specific embodiment of the information, the I-CSCF 10 passes the location information for a second contact to the S-CSCF 12. The HSS 11 in step S4 of FIG. 3 returns location information to the I-CSCF 10. The information included in the Cx-Query Response is a GPRS-Roaming-Status Attribute Value Pair (AVP) and 3GPP-SGSN-MCC-MNC AVP. Note that this step is mandatory in all registrations of new contacts, and so location information is always sent to the I-SCSF 10 if the information is available at the HSS 11.

The I-CSCF 10 includes the received location information in the REGISTER message (step S5) sent to the S-CSCF 12, thus providing the S-CSCF 12 with the required location information.

The advantages of this embodiment are that the S-CSCF does not need to download the user profile, or make an analysis of when to download a user profile. Furthermore, no bandwidth is wasted on unnecessary signalling. There is no impact on the existing HSS logic, and no need to use a new AVP since the required AVP is already stored in the HSS. However, Cx modifications are required in order to include the GPRS-Roaming-Status AVP and 3GPP-SGSN-MCC-MNC AVP in the Cx-Query response instead of the Cx-Pull Response. Furthermore, modifications to the SIP signalling are required to pass the location info from the I-CSCF 10 to the S-CSCF 12, and new S-CSCF logic is required to handle the location information.

In a second specific embodiment of the invention, the I-CSCF 10 sends an indication that location information associated with a second contact is available from the HSS 11 to the S-CSCF 10. The S-CSCF 10, on receipt of this indication, obtains the location information from the HSS 11.

When a user registers a contact, the HSS 11 sends an indication to the I-CSCF 10 that location information available. This information is sent in step S4 of FIG. 3, as a response to the authorization checks at the reception of the Cx-Query from the I-CSCF.

The I-CSCF 10 sends the indication in the REGISTER message send in step S5 to the S-CSCF 12, and as a result of receiving this indication, the S-CSCF 12 requests the location information from the HSS 11 as part of step S6 in the Cx-Put/Pull. The S-CSCF may choose to either download the whole profile associated with the contact, or just the location information associated with the contact.

The second specific embodiment requires no unnecessary download of the user profile, since S-CSCF only requests the user profile or location information if the indication is received. There is no impact on the HSS 11 logic or either of the CSCF's 10,12 data handling. However, this embodiment does require modifications to the Cx signalling, for example a new AVP in the Cx-Query Response. SIP modifications are required in order to send the location information from the I-CSCF 10 to the S-CSCF 12. Furthermore, support of the standard User-Data-Already-Available AVP is required if standard Cx is used, and this embodiment requires an additional transaction over the Cx interface, which increases the overall traffic.

In a third specific embodiment of the invention, the S-CSCF 12 requests the entire user profile associated with a second contact from the HSS 11 if the S-CSCF detects that the user is registering a new contact with an IMPU that is already registered, and the access type is different from the one used with the existing registered contact. The access type for the existing registered contact can be determined from information contained in a PANI for the existing registered contact.

If the S-CSCF 12 detects the above circumstances, then it initiates a new Cx-Pull request (which may be a UDR Diameter command or a SAR Diameter command) towards the HSS 11. 3GPP standards allow an option in this request of "NO_ASSIGNMENT" in order to allow the S-CSCF 12 to obtain the user profile without any user registration state modification. The HSS 11 returns the user profile and also the user location information GPRS-Roaming-Status AVP to the S-CSCF 12.

This embodiment requires no Cx modifications, and has no impact on either the HSS 11 logic or CSCF 10, 12 user data handling. A PANI analysis is performed by the S-CSCF if location information is available from the HSS 11, so there is very little additional processing burden placed on the S-CSCF 12. However, because the user profile is downloaded to the S-CSCF 12, there is an increase in the required and the S-CSCF 12 must perform a new user profile analysis. Furthermore, an addition Cx interface transaction is required, leading to an increase in signalling. This may even be unnecessary in cases where the HSS 11 has no location information for the contact.

According to a fourth specific embodiment of the invention, similar to the third specific embodiment, the S-CSCF 12 requests the location information for the second contact from the HSS 11 in the event that the S-CSCF detects that the user is registering a new contact with an IMPI/IMPU pair that is already registered, and the access type is different from the one used with the existing registered contact. The access type for the existing registered contact can be determined from information contained in a PANI for the existing registered contact.

A new Cx-Pull request (either UDR Diameter or SAR Diameter command) is initiated towards the HSS 11 from the S-CSCF, and a new AVP is included in the request to indicate that the S-CSCF 12 only requires the user location information associated with the contact.

3GPP defines an indication AVP called User-Data-Already-Available (when setting to USER_DATA_ALREADY_AVAILABLE) to indicate that the user profile is already stored in the S-CSCF. The fourth specific embodiment makes use of this AVP in order to avoid downloading the entire user profile download to the S-CSCF 12 and to include a new indication in the UDR/SAR command (e.g. a Location-Information AVP or even the existing GPRS-Roaming-Status AVP set to any value that the HSS shall not process). The HSS 11 returns only the user location information GPRS-Roaming-Status AVP to the S-CSCF 12.

As the whole user profile is not unnecessarily downloaded, there is no unnecessary use of bandwidth and no extra S-CSCF analysis required to extract the location information from the user profile information. There is no impact on HSS logic, and as a PANI analysis has to be done anyway, the analysis of the PANI to determine the access type of the existing registered contact does not add a significant processing burden to the S-CSCF 12. However, this embodiment requires Cx modifications to include an AVP indicating that only location information should be downloaded from the HSS 11, and to support the use of the standard User-Data-Already-Available AVP. An addition Cx interface transaction is required which increases traffic, and may be unnecessary if HSS does not have any location information for this user contact.

Figure 5:
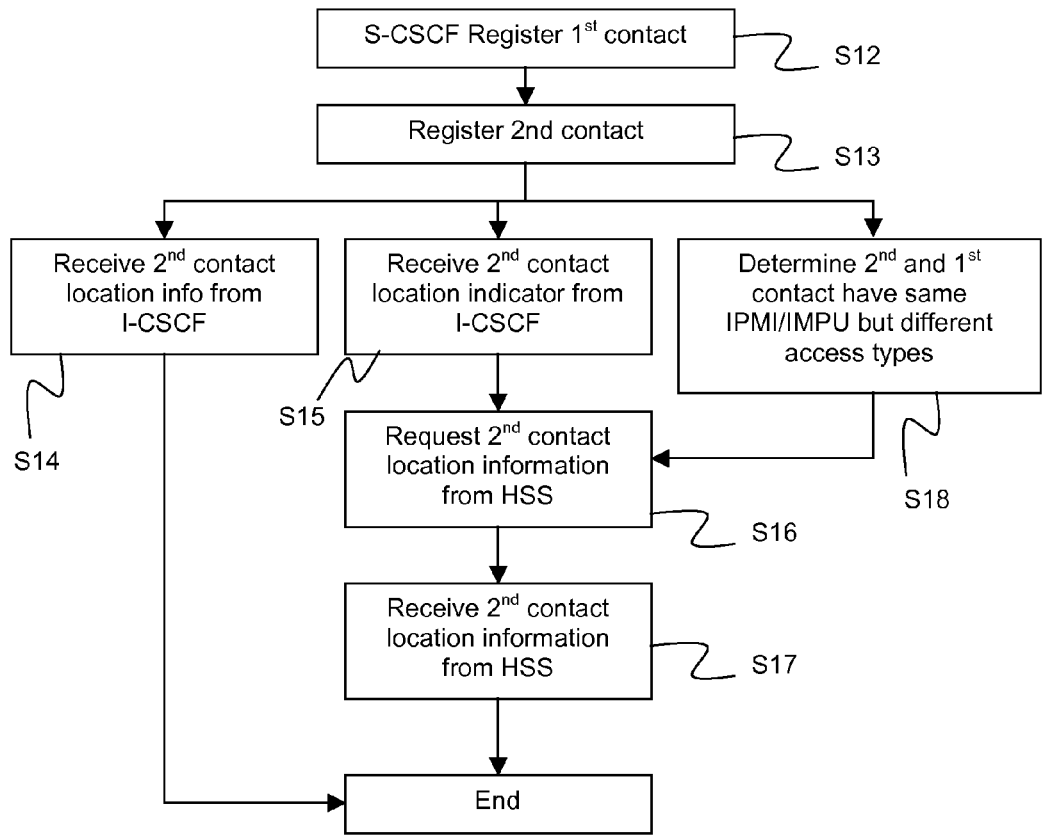
FIG. 5 is a flow diagram showing steps according to different embodiments of the invention.

FIG. 5 is a flow diagram summarizing the four embodiments described above. The following numbering corresponds to the numbering used in FIG. 5:

S12. The S-CSCF 12 has a first contact registered with it, the first contact being associated with an IMPI/IMPU pair. The S-CSCF 12 also has location information associated with the first contact.

S13. A user wishes to register a second contact using a different access but also using the same IMPU.

S14. According to the first specific embodiment, the HSS 11 sends location information associated with the second contact to the I-CSCF 10, which then forwards the location information to the S-CSCF 12 in a SIP REGISTER message.

S15. According to the second specific embodiment, the HSS 11 sends an indicator to the I-CSCF 10 that location information associated with the second contact is available at the HSS. The I-CSCF 10 sends the indicator to the S-CSCF 12 in a SIP REGISTER message. Go to step S17.

S16. According to the third and fourth specific embodiments, when a second contact is registered at the S-CSCF 12, the S-CSCF 12 determines that the first and second contacts are associated with the same IMPU, but with different access types. The access types can be determined from information contained in PANI headers.

S17. The S-CSCF 12 requests the location information associated with the second contact from the HSS 11.

S18. The HSS 11 sends the requested location information associated with the second contact to the S-CSCF 12. According to the third specific embodiment, the entire user profile including the location information of the second contact is sent to the S-CSCF 12.

Figure 6:
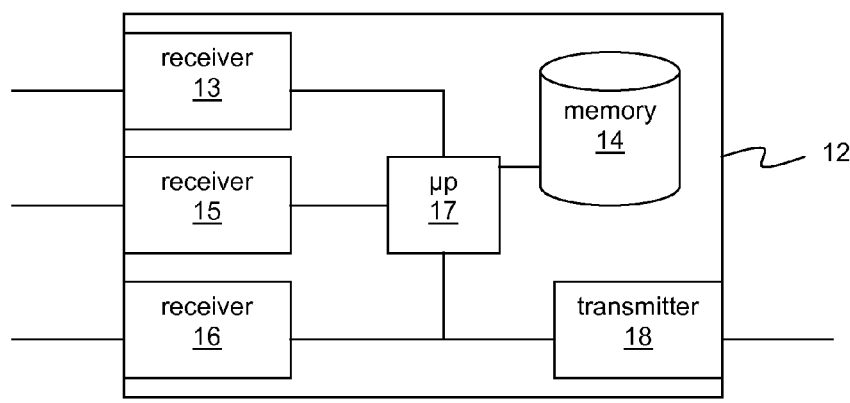
FIG. 6 illustrates schematically in a block diagram a Serving-Call session Control Function node.

Turning now to FIG. 6, there is illustrated a S-CSCF 12. The S-CSCF 12 comprises a first receiver 13 for receiving a request to register a first contact associated with an IMPU, and for receiving location information associated with the first contact. This information is stored in a memory 14. A second receiver 15 is provided for receiving a request to register a second contact associated with the same IMPU, and a third receiver 16 is provided for receiving location information associated with the second contact. Of course, the three receivers may all be embodied in a single receiver. According to the third and fourth specific embodiments described above, the S-CSCF 12 is also provided with a processor 12 for determining that the second contact is associated with the same IMPU as the first contact, and that an access type for the second contact is different to that of the first contact. A transmitter 18 may also be provided for sending a request to a HSS 11 for the location information associated with the second contact.

Figure 7:
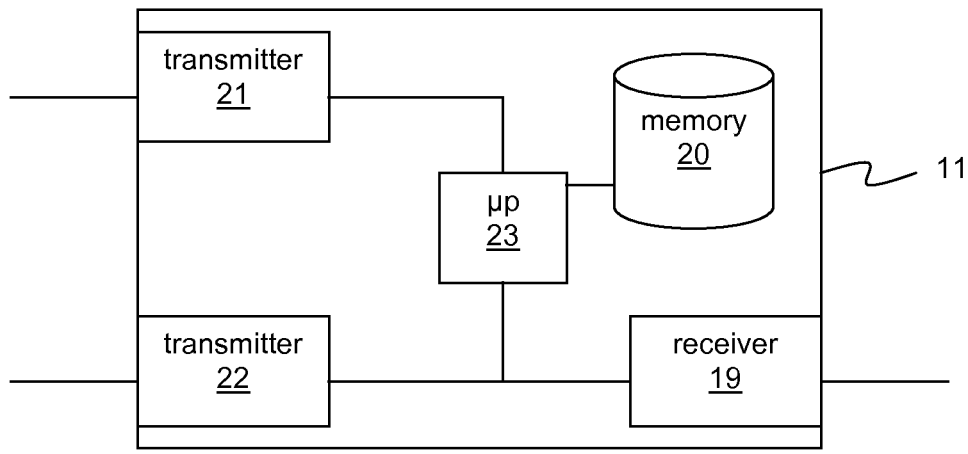
FIG. 7 illustrates schematically in a block diagram a Home Subscriber Server.

Referring to FIG. 7, an HSS 11 is illustrated. The HSS 11 comprises a receiver 19 for receiving signalling relating to contacts, and a memory 20 for storing location information associated with the first contact and location information associated with the second contact. A first transmitter 21 is provided for sending the location information associated with the first contact to the S-CSCF 12, and a second transmitter 22 is provided for sending the location information associated with the second contact to either the S-CSCF 12 or the I-CSCF 10, depending on which of the above-described embodiments is being used. A processor 23 is also provided for controlling the signalling.

Figure 8:
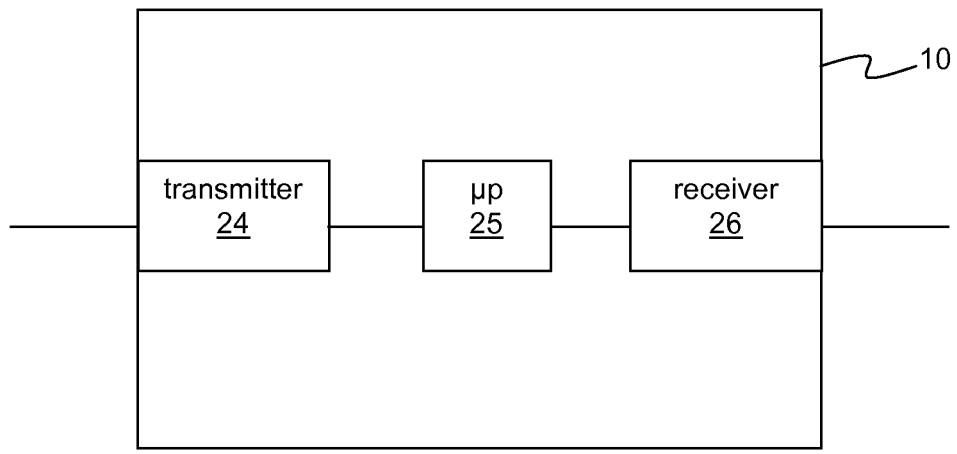
FIG. 8 illustrates schematically in a block diagram an Interrogating-Call session Control Function node.

Turning now to FIG. 8, there is illustrated schematically an I-CSCF 10. The I-CSCF is provided with a receiver 24 for receiving information relating to location information associated with the second contact. This information may be the location information itself, or may be an indication that the location information is available from the HSS 11, as described in the first and second specific embodiments above. A processor 25 is provided fro controlling signalling, and a transmitter 26 is also provided for sending the information relating to the location information to the S-CSCF 12.

The invention allows the use of the roaming information in scenario where a user nas registered multiple contacts, and allows charging on the basis of location information. Furthermore, other location-based services can also be used even where a user has registered multiple contacts.

It will be appreciated by the person of skill in the art that various modifications may be made to the above-described embodiments without departing from the scope of the present invention.

The following abbreviations have been used in the description:
3GPP 3rd Generation Partnership Project
HSS Home Subscriber Server
I-CSCF Interrogating Call Session Control Function
IMPI IP Multimedia Private Identity
IMPU IP Multimedia Public Identity.
IMS IP Multimedia Subsystem
IP Internet Protocol IRS Implicit Registration Set
S-CSCF Serving Call Session Control Function
SIP Session Initiated Protocol
UE User Equipment

The invention claimed is:

1. A method of providing location information to a Serving Call Session Control Function (S-CSCF) in an IP Multimedia Subsystem (IMS) network, the method comprising performing the following at the S-CSCF:
   registering a first contact associated with a pair of Private User Identity and Public User Identity in an IMS subscription and also associated with a non-mobile access, and receiving location information associated with the first contact;
   registering a second contact for the same IMS subscription and associated with the same pair of Private User Identity and Public User Identity as that used for registering the first contact, the second contact being associated with a mobile access; and
   receiving one of the following from an Interrogating-Call Session Control Function (I-CSCF):
      location information associated with the second contact, the location information associated with the second contact having been previously sent to the I-CSCF from a Home Subscriber Server (HSS) after the second contact is registered at the HSS, and
      an indicator indicating that location information associated with the second contact is available at the HSS, wherein location information associated with the second contact is then received by the S-CSCF in response to a request sent from the S-CSCF to the HSS requesting the location information.

2. The method according to claim 1, wherein the location information associated with the second contact is received from the I-CSCF in a Session Initiation Protocol message.

3. The method according to claim 1, wherein the indicator is sent in a Session Initiation Protocol message.

4. A Serving-Call Session Control Function (S-CSCF) node in an IP Multimedia Subsystem (IMS) network, wherein the S-CSCF node is configured to perform the following;
   receive a request to register a first contact associated with a pair of Private User Identity and Public User Identity in an IMS subscription and also associated with a non-mobile access, and also receive location information associated with the first contact;
   store the location information associated with the first contact;
   receive a request to register a second contact for the same IMS subscription and associated with the same pair of Private User Identity and Public User Identity as that used in the request to register the first contact, the second contact being associated with a mobile access; and
   receive one of the following from an Interrogating-Call Session Control Function (I-CSCF);
      location information associated with the second contact, the location information associated with the second contact having been previously sent to the I-CSCF from a Home Subscriber Server (HSS) after the second contact is registered at the HSS, and
      an indicator indicating that location information associated with the second contact is available at the HSS, wherein location information associated with the second contact is then received by the S-CSCF in response to a request sent from the S-CSCF to the HSS requesting the location information.

5. An Interrogating-Call Session Control Function(I-CSCF) node in an IP Multimedia Subsystem (IMS) network, wherein the I-CSCF node is configured to perform the following:
   receive from a Home Subscriber Server (HSS) information relating to location information associated with a first contact, wherein the first contact is associated with a pair of Private User Identity and Public User Identity in an IMS subscription and also associated with a mobile access, where a second contact for the same IMS subscription and associated with a non-mobile access and also associated with the same pair of Private User Identity and Public User Identity as that for the first contact is already registered at a Serving Call Session Control Function (S-CSCF) node in the IMS network; and
   send one of the following information to the S-CSCF node relating to the location information associated with the first contact:
      location information associated with the first contact, the location information associated with the first contact having been previously sent to the I-CSCF node from the HSS after the first contact is registered at the HSS, and
      an indication that location information associated with the first contact is stored at the HSS, thereby allowing the S-CSCF node to send a request to the HSS for the location information associated with the first contact.

* * * * *